INVENTOR.
JOSEPH A. MAS

INVENTOR.
JOSEPH A. MAS
BY
ATTORNEY

United States Patent Office 3,376,491
Patented Apr. 2, 1968

3,376,491
DIRECT CURRENT INVERTER FOR OPERATING ALTERNATING CURRENT DEVICES
Joseph A. Mas, Woodbury, N.Y., assignor to Dynamic Instrument Corp., a corporation of New York
Filed Jan. 22, 1963, Ser. No. 253,170
1 Claim. (Cl. 321—25)

ABSTRACT OF THE DISCLOSURE

A transistorized oscillator developing square wave power for energizing a power supply adapted to be normally energized by sinusoidal power and including a saturable reactor connecting said oscillator and power supply and operable to become saturated within a time at least equal to one quarter of a cycle of the frequency of oscillation of said oscillator.

---

This invention relates to battery operated power sources, and more particularly concerns inverters for changing direct current power supplied from a battery to alternating current power for operating electrical devices such as radio or television receivers requiring peak and RMS voltage values chaacteristic of a sinusoidal wave.

Heretofore, problems have arisen in the provision of battery operated, alternating current power sources, particularly for television and radio receivers since the most effective and efficient mode of inversion results in the production of power having a non-sinusoidal wave form. When utilizing such non-sinusoidal power and particularly square wave power for operating electrical devices such as television and radio equipment, it was necessary to limit the peak value of such power to RMS value of normal sinusoidal power to prevent overheating of the tubes and modifying their operating characteristics. Lowering the peak voltage resulted in proportionally lowering the plate voltage generated by the radio or television power supply so that the device would not operate at its designed efficiency, if at all.

Accordingly, one object of the present invention resides in the provision of a novel and improved inverter which overcomes the aforesaid difficulties and provides non-sinusoidal alternating current power having the same relative peak and RMS values as sinusoidal power.

Another object of the invention resides in the provision of a novel and improved square wave power supply particularly useful for powering radio and television receivers designed for operation on sinusoidal power.

Another object of the invention resides in the provision of a novel and improved battery operated power supply for television receivers that will provide a clear image having a quality and stability corresponding to the image quality and stability when operated in the conventional manner on alternating current power.

A still further object of the present invention resides in the provision of an improved inverter power source of the above character which is of simple design and construction, economical to manufacture, and highly efficient in the accomplishment of its intended purpose.

The above and other objects and advantages of the invention will be more fully understood from the following description of the preferred embodiments of the invention, shown, by way of example, in the accompanying drawings, in which:

FIGURE 5 is another schematic circuit diagram of a battery operated power source in accordance with the invention in circuit with a power supply for a television or a radio receiver.

Figure 1:
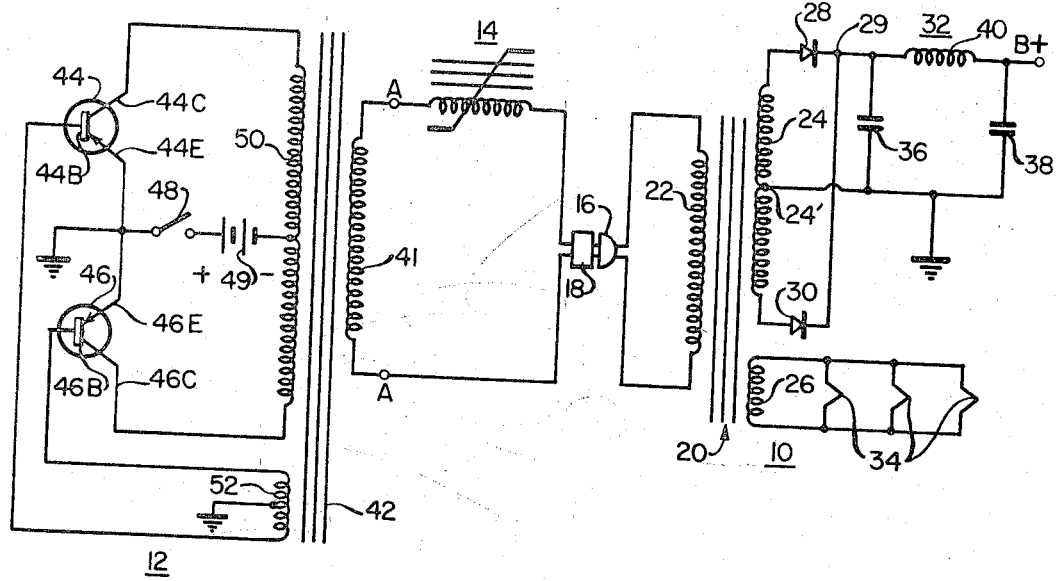
FIGURE 1 is a schematic circuit diagram of a battery operated power source in accordance with the invention in circuit with a power supply for a television or radio receiver.

One embodiment of the invention is illustrated in FIG. 1 of the drawings and is particularly useful for converting DC power to AC power for use in operating radio and television receivers. The power supply 10 shown in FIG. 1 is of conventional configuration and includes a power transformer 20 having a primary winding 22 connected to the male plug 16. The secondary windings include a high voltage winding 24 having a center tap 24' and a low voltage winding 26 for heating the filaments 34 of the tubes in the receiver. The voltage induced in the high voltage winding 24 is converted to DC by rectifiers 28 and 30 which afford full wave rectification, and the rectified DC voltage which appears between the center tap 24' and the terminal 29 is filtered by a pair of condensers 36 and 38 and a filter choke 40. It is to be understood that any filter configuration may be employed and half wave rectification may be utilized in place of full wave rectification.

With the conventional power supply as described above, the application of a sinusoidal voltage to the primary will produce a DC voltage at the B+ terminal approximately equal to the peak value of the sinusoidal voltage in one half of the secondary 24, provided, however, that the filter 32 has capacity input and further, that the input capacitor is large enough to assure the attainment of a DC voltage equal to the alternating current peak. With choke input filters or filters having relatively small input capacitors, the output voltage will, of course, be somewhat lower than the alternating current peak. In any event, the output voltage of the power supply is a function of the peak voltage of the alternating current. With reference to the heater winding 26, it is important that the total power delivered to the tube filaments 34 be within the recommended value since excess power will substantially shorten the life of the tubes. In determining the power applied to a tube, the RMS value of the sinusoidal voltage is used in the computation. Thus, in order to obtain proper operation from a television or radio receiver utilizing vacuum tubes, it is necessary to apply a sinusoidal voltage to the primary to obtain the designed peak DC voltage and the proper power to the filaments of the tubes. Now should the conventional power supply 10 be connected to an alternating current supply having a square wave form, normal receiver operation could not be obtained since a voltage having a square wave form has an RMS value equal to the peak value of the square wave. Should the peak value of the square wave be adjusted to produce the desired plate voltage, then the power supplied to the filaments of the tubes will be greatly in excess of the rated value. Conversely, if the power supplied to the tubes is adjusted to the rated value, then the DC plate voltage will be substantially below the rated value. Thus, known oscillators for conversion of direct current to alternating current for operation of conventional electrical devices such as radio and television receivers are arranged to generate sinusoidal output wave forms and in so doing, the efficiency of the conversion is relatively low. With this invention, however, an improved generator having a square wave form is provided which, when used to feed a power supply such as shown at 10 in FIGURE 1, will produce the same DC voltage and heater power produced when the supply 10 is fed from a sinusoidal power source.

The square wave oscillator 12 is a conventional common emitter, square wave oscillator which provides a substantially square wave output at terminals A—A of the output winding 41 of transformer 42. The circuit 12 includes a pair of transistors 44, 46 which operate as switches with one being "on" while the other is "off" and vice-versa. The emitters 44E and 46E of transistors 44, 46 are connected in common to ground and through switch 48 and a DC battery supply 49 to a center tap on the input winding 50 of transformer 42. The bases 44B and 46B of transistors 44, 46 are connected to opposite ends of an excitation or base drive winding 52, having its center point grounded. The collectors 44C and 46C are connected to the outer terminals of the winding 50.

The square wave oscillator 12 is set into operation as soon as battery 49 is connected in the circuit because of slight transients inherent in the circuit. Assume that transistor 44 is rendered conductive and that transistor 46 is non-conductive at the outset, then the voltage of battery 49 is effectively connected across the upper half of the winding 50, i.e., the top portion of the primary or input winding 50 and induces a voltage in all windings including windings 41 and 52. When transistor 44 starts to conduct, the voltages and currents in the windings assume a maximum level and remain at this level until the core of transformer 42 is saturated. When the core of transformer 42 becomes saturated, then the rate of change of flux becomes zero. When the rate of change of flux becomes zero, the base drive of transistor 44 derived from excitation winding 52 is placed at ground potential. During the same time interval, the voltage induced in the transformer output winding 41 decreases in value and then becomes zero. The current flow now also begins to decrease and causes the flux to be built up in an opposite direction. Transistor 46 then starts to conduct and a voltage of opposite polarity is then induced in the windings. The operation of the circuit with transistor 46 conducting is the same as for transistor 44, except that the voltages induced in the windings are of an opposite polarity. Upon saturation of the core and removal of the base drive to transistor 46, the cycle repeats and transistor 44 commences to conduct again. It will be noted that the output produced across terminals A—A is a square wave, and the frequency of operation is a function of the voltage of the battery 49 and the characteristic of the transformer 50.

It has been found that by modifying the output of the square wave oscillator 12, it is possible to utilize the square wave energy for operating a conventional alternating current radio or television receiver and at the same time obtain the desired DC voltage for the receiver without exceeding the rated power input to the tube heaters. This is accomplished through the utilization of a reactor 14 which is connected in series with the output winding 41 of the transformer 42. This reactor does not materially change the square wave characteristic of the energy from the oscillator 12, but it does limit the duration of the positive and negative pulses in a predetermined manner.

The control of the pulse widths is accomplished by utilizing a reactor having a predetermined saturating characteristic. In this way, it has been found possible to produce power having a square wave form wherein the peak and RMS values very nearly correspond to the relationship of the peak and RMS values of sinusoidal power. Furthermore, the principles of this invention are equally applicable for use with inverters or other devices generating other types of non-sinusoidal wave forms.

Figure 2:
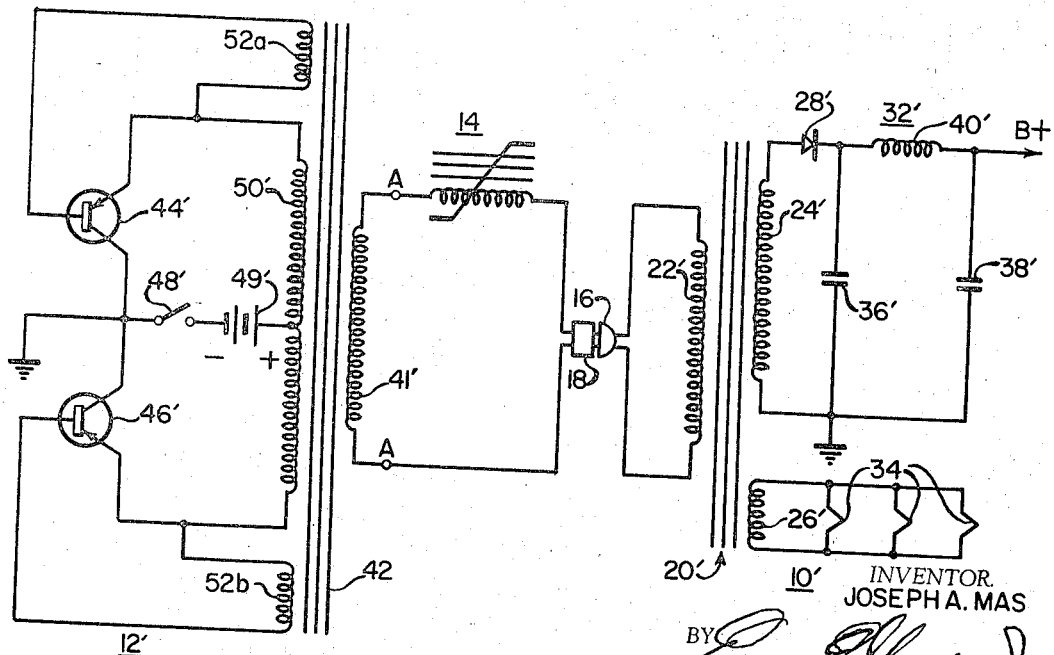
FIGURE 2 is a graphical representation of the hysteresis loop of a saturable reactor used in the circuit of FIG. 1.
Figure 2:
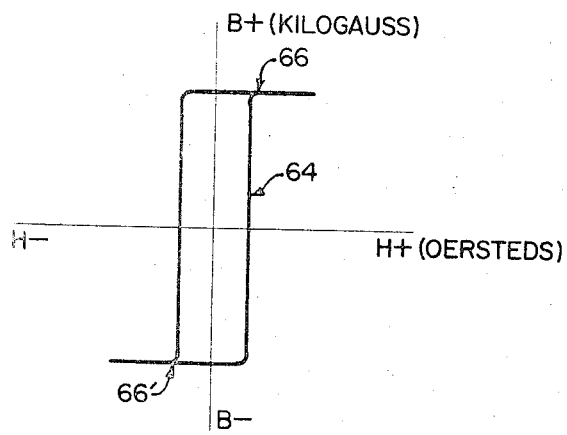
Figure 3:
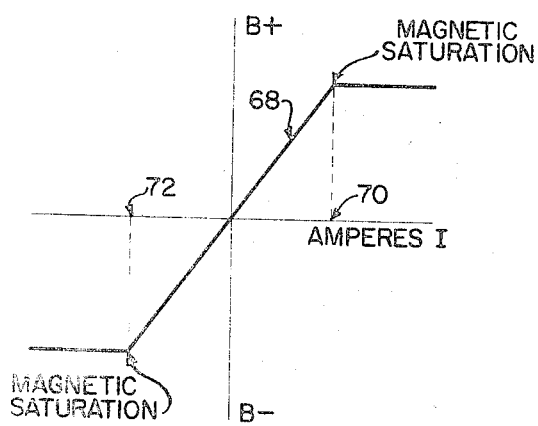
FIGURE 3 is a graphical representation of the magnetization curve of the saturable reactor used in the circuit of FIG. 1.

The characteristics of a saturable reactor can probably best be understood by referring to FIGS. 2 and 3, showing ideal characteristics of such a device. An ideal saturable reactor has a substantially rectangular hysteresis curve which is represented by the numeral 64 in FIG. 2. The abscissa is the magnetizing force H in oersteds, while the ordinate is the flux density in kilogauses. The points 66 and 66' on the curve 64 are points of saturation wherein the flux density B has reached a maximum, notwithstanding any further increase in the magnetizing force. The curve 68 of FIG. 3 relates the current through a saturable reactor to the flux density and it will be observed that when the current reaches the point 70 or 72, as the case may be, saturation is reached, and the reactor thereafter exhibits a low impedance characteristic. By proper design of the saturable reactor, it will exhibit a relatively high impedance until the point of saturation has been reached and thereafter, it exhibits an exceedingly low impedance. Thus, the reactor may be considered in the nature of a switch.

It has been found that the combination of a properly designed saturable reactor in combination with a square wave generator such as the generator 12 of FIG. 1 can be utilized to provide power for operating television and radio receivers as well as other electrical devices, and this constitutes a highly dependable, relatively inexpensive and efficient mode of converting DC to alternating current for operation of devices, and particularly those wherein the relationship of the peak value of the voltage to the RMS value is important in order to effect proper operation.

As will be shown, the saturable reactor 14 functions in accordance with the invention to reduce the RMS value of square wave power, while permitting the peak value to remain uneffected. With sinusoidal power, the RMS value of voltage or current, as the case may be, is what may be termed an effective value and corresponds to the energy that would be produced by a corresponding value of DC voltage or current. Thus, in determining the power to be delivered to a heating element such as the filament of vacuum tube, the RMS value of voltage and current is used to determine the energy to be dissipated in the heater. The RMS voltage is equal to .707×the peak value of the voltage or roughly two-thirds of the peak value. Thus, if square wave power were used to operate a radio receiver having a plate voltage of three hundred volts and the amplitude of the voltage applied to the receiver was maintained within a value that would not overheat the filaments of the tubes, then the plate voltage would be reduced to approximately two hundred volts which is far below the value for satisfactory operation of a device designed for a higher voltage. With a saturable reactor, however, it is possible to maintain the peak value of the square wave voltage while at the same time, reducing the RMS value and thereby apply the proper power to the tubes and at the same time, obtain a normal operating DC voltage for the receiver.

Figure 4A:
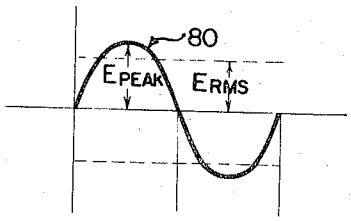
FIGURES 4a, 4b and 4c are graphical representations of a pure sinusoidal wave variation and two non-sinusoidal or square wave variations, respectively, all with the same maximum or peak value.
Figure 4B:
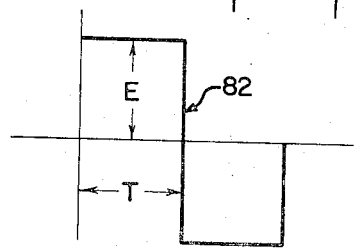
Figure 4C:
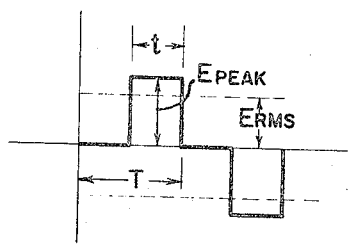

Referring now to FIGS. 4a through c, FIG. 4a shows a typical sinusoidal wave 80 illustrating the relationship of the peak and RMS values of the voltage. FIG. 4b shows a typical square wave 82 in which the voltage E is both the peak voltage as well as the RMS voltage. With this invention, the wave form of the power obtained from the generator 12, which is essentially that illustrated in FIG. 4b, produces a wave form such as shown in FIG. 4c wherein the RMS value is roughly .707 of the maximum or peak value. This is attained by maintaining the pulse magnitude as shown, for instance, in FIG. 4b but modifying the pulse width as shown in FIG. 4c.

To determine the desired pulse width to achieve the objectives of this invention, let it be assumed that the original square wave as shown in FIB. 4b has a time duration of "T" for each half cycle and that the duration of each square wave pulse as shown in FIG. 4c is "t." It is known that in the case of sinusoidal voltage.

$$E_{RMS} = .707 E_{Peak}$$

and that with square wave voltage $$E_{RMS} = E_{Peak}$$

It follows from the foregoing equations that the RMS value of an alternating voltage is a function of both peak value and time. In the case of the square wave, it may therefore be stated that $$E_{RMS} = E_{Peak} \sqrt{\frac{t}{T}} = .707 E_{Peak}$$

solving for $t$ $$\sqrt{\frac{t}{T}} = .707$$

$$\frac{t}{T} = .5$$

$$t = \frac{T}{2}$$

It is evident from the foregoing equations that if the duration of each half cycle of the square wave power from generator 12 is modified so that the half cycle pulses are reduced to one-half the duration while the frequency remains unchanged, then the desired peak and RMS values will be obtained.

In order to determine the saturable reactor 14 which is to be used, the following transformer equation may be used $$t_s = \frac{4 \cdot B \cdot A \cdot N}{E \cdot 10^8}$$

where:
$E$ = maximum value of voltage output at A—A
$B$ = saturation flux density of core for saturable reactor 14 in lines per square inch
$A$ = area of core of reactor 14 in square inches
$N$ = number of turns in winding composing the saturable reactor 14
$t_s$ = time of saturation of the saturable reactor The complete cycle of the square wave output at A—A is 2T, and the time $t_s$ for saturation of reactor 14 is therefore ¼ of the period 2T so that $t_s$ would be ¼ the time for the entire cycle. Therefore $$t = \frac{1}{4F}$$

where F is the frequency of generator 12.

Solving the transformer equation for the product of A and N in terms of frequency, it will be found that $$AN = \frac{E \cdot 10^8}{4 \cdot B \cdot F} = \frac{E \cdot 10^8}{16 \cdot B \cdot F}$$

For those situations, where the voltage wave is non-sinusoidal but not necessarily a square wave, suitable modification of the reactor 14 can be made following the foregoing teachings.

The invention may of course be utilized with types of inverters and power supplies other than those shown in FIG. 1. For instance, the inverter 10 of FIG. 1 may take the form as shown at 10' in FIG. 5, and the receiver power supply may utilize half-wave rectification as shown at 12' of FIG. 5. For simplicity, components in FIG. 5 similar to the components in FIG. 1, have been designated with like primed numerals and the mode of operation of the circuit is substantially identical to that of FIG. 1, except for the common collector circuit in the inverter and the utilization of a single rectifier 28'.

When using the invention as described thus far for powering radio receivers and other electrical devices designed for operation on sinusoidal power, a generator frequency of sixty cycles is very satisfactory. With the television receivers, however, considerable difficulty has been heretofore experienced with sixty cycle DC inverters because variations in the frequency of operation of the inverter result in picture distortion. This distortion occurs because the vertical timing pulses transmitted by the station are usually controlled by the power line frequency at the station, and differences between the frequency of the vertical timing pulses and the power line frequency at the receiver will produce beat frequencies clearly evident in the picture. It has been found that the difficulty may be overcome by utilizing an inverter frequency substantially higher than sixty cycles and preferably not a multiple of the sixty cycle frequency. For example, it has been found that desirable inverter frequencies may be 150, 230 or 270 cycles per second. With a frequency such as 270 cycles per second, it has been found in actual tests that it is difficult to detect any image distortion from beat frequencies that may occur between the vertical synchronizing frequency and the frequency of the inverter. Furthermore, since television receivers are designed for operation in sixty cycles, substantially heavy filtering is utilized to remove the AC ripple from the DC voltage supply. When the power frequency is increased two or three times the design power frequency, the efficiency of the filtering systems in the receiver are greatly increased, so that the AC ripple which may affect the synchronizing circuits is reduced far below the ripple that is encountered with the sixty cycle power frequency. When the higher frequency is utilized for powering radio receivers, it is therefore evident that the hum level in the radio receiver will also be materially reduced. Inasmuch as the conventional power transformers utilized on radio and television receivers are designed for operation at sixty cycles, the use of such transformers on frequencies of 270 c.p.s., 330 c.p.s. or even higher, results in increased efficiency. In the design of a DC inverter as previously described for powering radio and television receivers, the saturable reactor must be designed for operation on the selected frequency as indicated by the equations previously set forth.

The improved combination of a square wave generator for the conversion of DC to AC and the utilization of a saturable reactor affords a highly efficient mode of conversion of energy and produces a dependable, relatively low cost mode of overcoming the difficulties heretofore encountered in providing power for operation of AC receivers from a DC source.

While only certain embodiments of the invention have been illustrated, it is understood that alterations, changes and modifications may be made without departing from the true scope and spirit thereof as defined in the appended claim.

What is claimed is:

1. In combination, a power supply adapted to be energized by sinusoidal power having a selected frequency and a peak value and including means for producing rectified direct current voltage for use as the plate voltage supply for multi-element electron tubes having heating elements therein and alternating current power for energizing said heating elements, transistorized oscillator means for generating an alternating current having a square wave form and a peak voltage equal to the peak voltage of said sinusoidal power and switching means comprising a saturable reactor wherein the saturation time is at least equal to one quarter of a cycle of said square wave alternating current whereby said power supply upon energization by said generating means will provide a direct current voltage and alternating current power having the same magnitudes as the direct current voltage and alternating current power produced by said supply when energized by sinusoidal power.

References Cited
UNITED STATES PATENTS

| | | | |
|---|---|---|---|
| 2,809,303 | 10/1957 | Collins | 307—106 X |
| 3,041,523 | 6/1962 | Kuba | 321—9 X |
| 3,061,769 | 10/1962 | Smyth | 321—45 X |
| 2,802,119 | 8/1957 | Timmel et al. | 307—106 |
| 2,937,298 | 5/1960 | Putkovich et al. | 321—45 |
| 2,849,614 | 8/1958 | Royer et al. | 321—25 |
| 3,060,363 | 10/1962 | Jensen | 321—45 |

JOHN F. COUCH, *Primary Examiner.*

W. M. SHOOP, *Assistant Examiner.*